United States Patent
Troy et al.

(10) Patent No.: US 7,643,893 B2
(45) Date of Patent: Jan. 5, 2010

(54) CLOSED-LOOP FEEDBACK CONTROL USING MOTION CAPTURE SYSTEMS

(75) Inventors: James J. Troy, Issaquah, WA (US); Charles A. Erignac, Seattle, WA (US); Paul Murray, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 317 days.

(21) Appl. No.: 11/459,631

(22) Filed: Jul. 24, 2006

(65) Prior Publication Data
US 2008/0125896 A1    May 29, 2008

(51) Int. Cl.
*G06F 19/00* (2006.01)
(52) U.S. Cl. .............................. 700/65; 702/153; 73/510
(58) Field of Classification Search .................... 700/56, 700/65, 95, 110, 66; 73/1.75, 510, 1.79; 702/150, 152, 153
See application file for complete search history.

(56) References Cited

U.S. PATENT DOCUMENTS

| | | | | |
|---|---|---|---|---|
| 4,654,949 A | * | 4/1987 | Pryor | 29/407.04 |
| 5,109,345 A | * | 4/1992 | Dabney et al. | 701/226 |
| 5,148,591 A | * | 9/1992 | Pryor | 29/407.04 |
| 5,380,978 A | * | 1/1995 | Pryor | 219/121.64 |
| 5,489,830 A | | 2/1996 | Fernandez | |
| 5,506,682 A | * | 4/1996 | Pryor | 356/623 |
| 5,637,826 A | | 6/1997 | Bessacini et al. | |
| 5,721,680 A | | 2/1998 | Van Cleve et al. | |
| 5,909,218 A | * | 6/1999 | Naka et al. | 345/419 |
| 6,460,004 B2 | * | 10/2002 | Greer et al. | 702/104 |
| 6,720,949 B1 | * | 4/2004 | Pryor et al. | 345/158 |
| 6,896,220 B2 | | 5/2005 | McKendree et al. | |
| 6,955,324 B2 | | 10/2005 | Tanielian | |
| 7,054,724 B2 | * | 5/2006 | Koshizen et al. | 701/1 |

(Continued)

FOREIGN PATENT DOCUMENTS

DE    19731724    1/1999

(Continued)

OTHER PUBLICATIONS

McNeely et al, "Six Degree-of-Freedom Haptic Rendering Using Voxel Sampling," Proc. ACM SIGGRAPH 99 Conf., Los Angeles, CA, Aug. 1999, pp. 401-408.

(Continued)

*Primary Examiner*—Charles R Kasenge
(74) *Attorney, Agent, or Firm*—Lee & Hayes, PLLC

(57) ABSTRACT

Systems and methods for closed-loop feedback control of controllable devices using motion capture systems are disclosed. In one embodiment, a system includes a motion capture system configured to measure one or more motion characteristics of one or more controllable devices as the one or more controllable devices are operating within a control volume. A processor receives the measured motion characteristics from the motion capture system and determines a control signal based on the measured motion characteristics. A position control system receives the control signal and continuously adjusts at least one motion characteristic of the one or more controllable devices in order to maintain or achieve a desired motion state. The controllable device may be equipped with passive retro-reflective markers. The motion capture system, the processor, and the position control system comprise a complete closed-loop feedback control system.

35 Claims, 15 Drawing Sheets

U.S. PATENT DOCUMENTS

| | | | |
|---|---|---|---|
| 7,099,747 | B2 * | 8/2006 | Mikami et al. .............. 700/245 |
| 7,313,463 | B2 * | 12/2007 | Herr et al. ................... 700/245 |
| 7,400,950 | B2 * | 7/2008 | Reich ............................ 701/3 |
| 2002/0142701 | A1 | 10/2002 | Rosenberg |
| 2003/0090682 | A1 * | 5/2003 | Gooch et al. ................ 356/620 |
| 2004/0073359 | A1 | 4/2004 | Ichijo et al. |
| 2005/0027406 | A1 | 2/2005 | Nonami et al. |
| 2005/0125099 | A1 * | 6/2005 | Mikami et al. .............. 700/245 |
| 2006/0082546 | A1 * | 4/2006 | Wey ............................ 345/156 |
| 2007/0003915 | A1 * | 1/2007 | Templeman ................ 434/247 |
| 2008/0033684 | A1 | 2/2008 | Vian et al. |

FOREIGN PATENT DOCUMENTS

| | | |
|---|---|---|
| GB | 2345952 | 7/2000 |
| WO | WO 9918555 | 4/1999 |
| WO | WO03027599 | 4/2003 |
| WO | WO2005003676 | 1/2005 |

OTHER PUBLICATIONS

McNeely, et al, "Voxel-Based 6-DOF Haptic Rendering Improvements," Haptics-e, vol. 3, No. 7, Jan 2006, 12 pgs.

Troy, et al, "Closed-Loop Motion Capture Feedback Control," (In Review), 2006, 2 pgs.

Troy, "Haptic Control of a Simplified Human Model with Multibody Dynamics," Phantom Users Group Conf., Aspen, CO, Oct 2000, pp. 43-46.

Carlson et al, "Reliability Analysis of Mobile Robots", Robotics and Automation, 2003, Proceedings ICRA 03, IEEE Intl Conf on Sep. 2003, vol. 1, 8 pages.

Castillo-Effen et al, "Modeling and Visualization of Multiple Autonomous Heterogeneous Vehicles", Systems, Man and Cybernetics, 2005 IEEE Intl Conference, Oct. 2005, vol. 3, 9 pages.

Chung et al, "A Platform for Cooperative and Coordinated Control of Multiple Vehicles", In Proc. of the 3rd Conf on Cooperative Control and Optimization, Dec. 2002, Chapter 1, pp. 1-33.

Cremean et al, "The Caltech Multi-Vehicle Wireless Testbed", Decision and Control, 2002, Proceedings of the 41st IEEE Conference, Dec. 2002, vol. 1, 3 pages.

Holland et al., "Beyond Swarm Intelligence: The Ultraswarm", Swarm Intelligence Symposium, 2005, SIS 2005, Proceedings 2005 IEEE, Jun. 2005, 8 pages.

Nardi et al, "SwarMAV: A Swarm of Miniature Aerial Vehicles", 21st Bristol Interl UAV Systems Conf, Apr. 2006, 9 pages.

Narli et al, "A Hardware-in-the-Loop Test Rig for Designing Near-Earth Aerial Robotics", Proceedings of the 2006 IEEE Internl Conference on Robotics and Automation, Orlando, Florida, May 2006, pp. 2509-2514.

Rizos, "Pseudolite Augmentation of GPS", presented at workshop on Geolocation and Navigation technology to support environmental geophysical mapping applications, organized by Strategic Environmental Research and Development Prog and Environmental Security Technology Certif Prog, May 2005, 15 pages.

Vachtsevanos et al, "From Mission Planning to Flight Control of Unmanned Aerial Vehicles: Strategies and Implementation Tools", Annual Reviews in Control, 29 (2005), pp. 101-115.

Lam, et al., "Tele-operating a UAV using Haptics—Modeling the Neuromuscular System", Systems, Man and Cybernetics, 2005 IEEE International Conference on Waikoloa, HI, Oct. 10-12, 2005, vol. 3, pp. 2695-2700.

* cited by examiner

CLOSED-LOOP FEEDBACK CONTROL USING MOTION CAPTURE SYSTEMS

CROSS REFERENCE TO RELATED APPLICATIONS

This patent application is referenced by co-pending, commonly-owned U.S. patent application Ser. No. 11/459,617 entitled "Autonomous Vehicle Rapid Development Testbed Systems and Methods" filed concurrently herewith on Jul. 24, 2006, which application is incorporated herein by reference.

FIELD OF THE INVENTION

This invention relates generally to systems and methods for closed-loop feedback control of controllable devices using motion capture systems.

BACKGROUND OF THE INVENTION

Many moveable devices require some type of control system. For example, a variety of vehicles, including remotely-controlled air, water, and land-based vehicles, require a control system that enables a human operator or a machine controller to monitor movements of the vehicle and issue appropriate control signals to guide the vehicle over a desired course. Similarly, manufacturing robots require a suitable control system to properly control movements during manufacturing operations. Clearly, a wide variety of controllable devices need control systems to effectuate the desired controllable movement.

Although prior art systems and methods for providing control signals to controllable devices have achieved desirable results, there is room for improvement. For example, control systems that use on-board cameras or navigational sensors may undesirably add to the weight and cost of the vehicle, and may not provide the accuracy and update frequency necessary for some applications. Novel systems and methods that mitigate these undesirable aspects of prior art control systems would therefore have utility.

SUMMARY OF THE INVENTION

The present invention is directed to systems and methods for closed-loop feedback control of controllable devices using motion capture systems. Embodiments of the invention may advantageously provide closed-loop feedback control in a highly accurate, rapid, and cost effective manner in comparison with prior art control systems and methods.

In one embodiment, a system for controlling one or more controllable devices includes a motion capture system, a processor, and a motion control system. The motion capture system is configured to repetitively measure one or more motion characteristics (e.g. positions and orientations) of the one or more controllable devices as the one or more controllable devices are operating within a control volume. The processor is configured to receive the measurements from the motion capture system, and determine a control signal based on the measurements. The motion control system receives the control signal and adjusts at least one motion characteristic of the one or more controllable devices in near real-time in a closed-loop feedback manner.

In another embodiment, a manufacturing system includes at least one controllable device including a position control system adapted to controllably position a workpiece. A plurality of markers are positioned on the workpiece, and a motion capture system is configured to repetitively measure one or more motion characteristics of the plurality of markers as the workpiece is controllably positioned within a control volume by the controllable device. A processing component receives the measured motion characteristics from the motion capture system and determines at least one command signal based on the measured motion characteristics. The position control system of the controllable device receives the command signal and adjusts at least one motion characteristic of the workpiece in a closed-loop feedback manner.

In yet another embodiment, a method of operating a controllable device includes measuring one or more motion characteristics of the controllable device using a motion capture system operatively disposed with respect to a control volume as the controllable device operates within the control volume; receiving the one or more measured motion characteristics from the motion capture system; determining a command signal based on the one or more motion characteristics; and transmitting the command signal to the controllable device to control at least one motion characteristic of the controllable device in a closed-loop feedback manner.

In still another embodiment, a method of viewing an activity includes positioning a moveable device within a control volume, the moveable device being equipped with a viewing device configured to view of the activity; measuring one or more motion characteristics of the moveable device using a motion capture system operatively disposed with respect to the control volume as the moveable device operates within the control volume; receiving the one or more measured motion characteristics from the motion capture system; determining a command signal based on the one or more motion characteristics; and transmitting the command signal to the moveable device to control at least one motion characteristic of the moveable device in a closed-loop feedback manner.

BRIEF DESCRIPTION OF THE DRAWINGS

Embodiments of the present invention are described in detail below with reference to the following drawings.

DETAILED DESCRIPTION

The present invention relates to systems and methods for closed-loop feedback control of controllable devices using motion capture systems, including such controllable devices as manned and unmanned flight vehicles, water and land-based vehicles, manufacturing vehicles and systems, and any other suitable controllable device or system. Many specific details of certain embodiments of the invention are set forth in the following description and in FIGS. 1-15 to provide a thorough understanding of such embodiments. One skilled in the art, however, will understand that the present invention may have additional embodiments, or that the present invention may be practiced without several of the details described in the following description.

Figure 1:
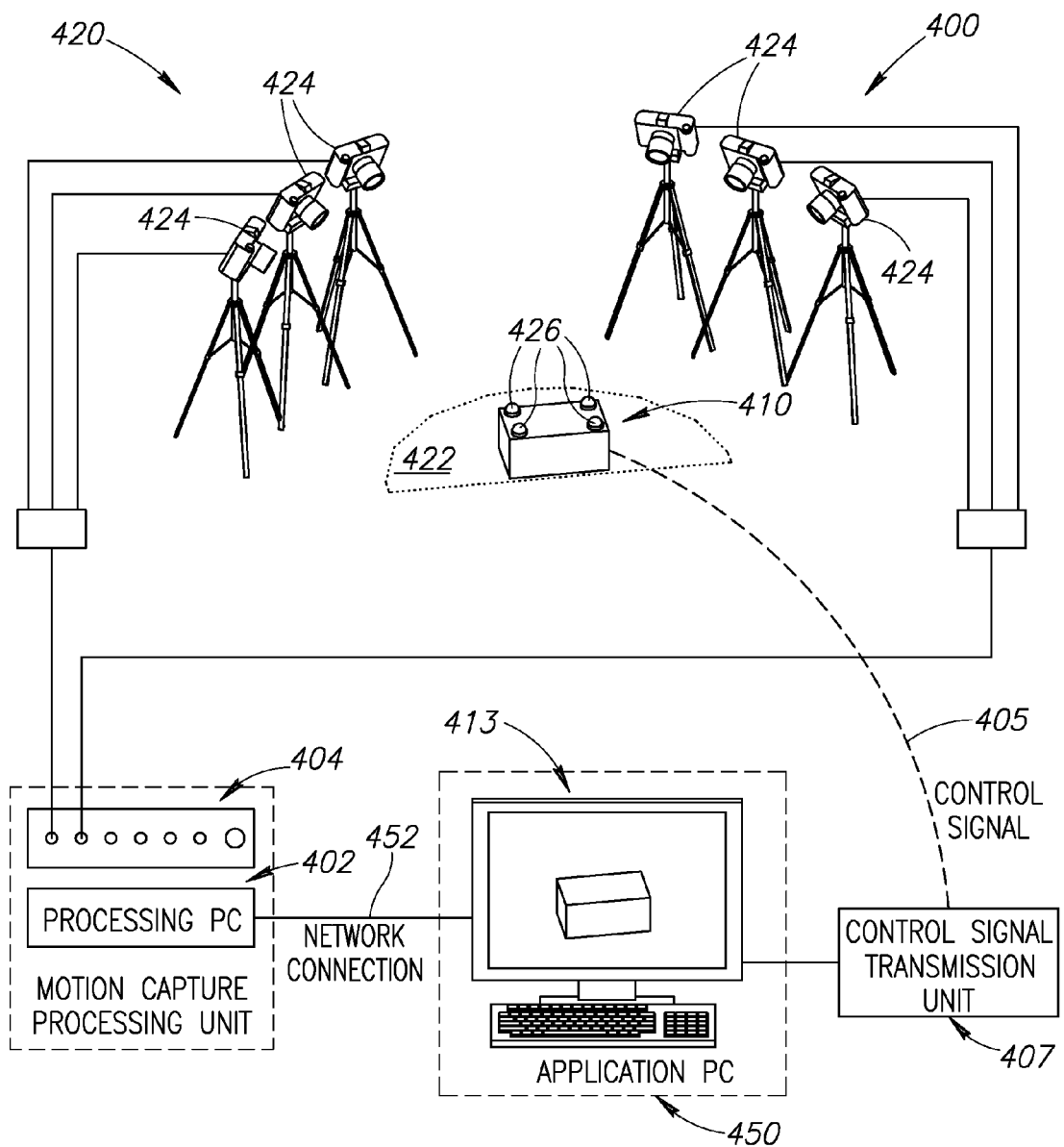
FIG. 1 is a schematic view of a real-time measurement and control system in accordance with an embodiment of the invention.
Figure 2:
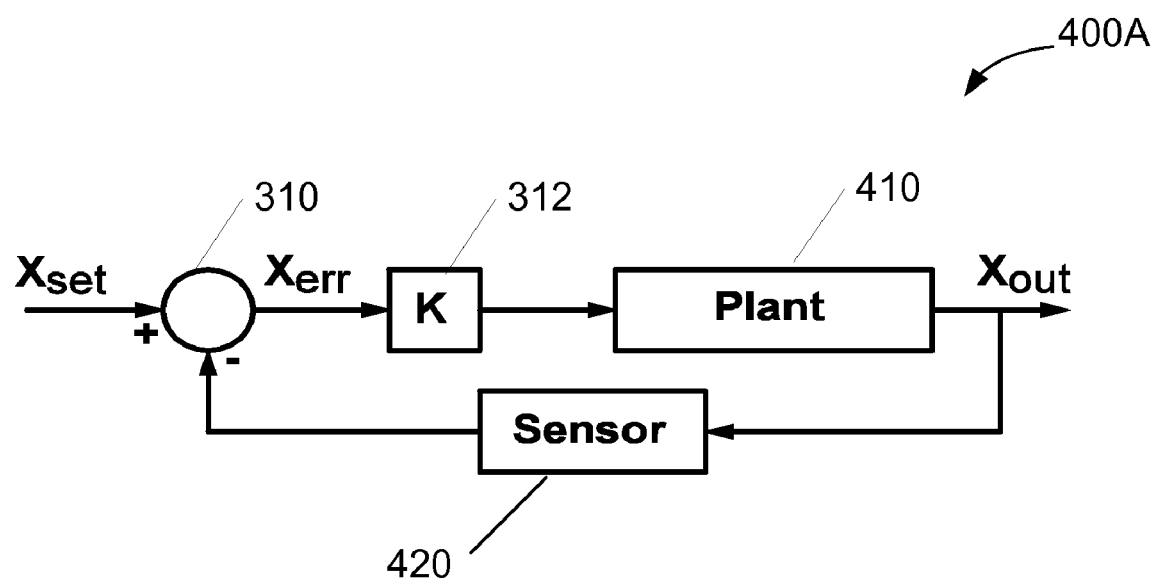
FIG. 2 is a schematic representation of the feedback control system of FIG. 1.

FIGS. 1 and 2 are schematic views of a control system 400 in accordance with an embodiment of the invention. In this embodiment, the control system 400 includes a motion capture processing computer 402 operatively coupled to a motion capture system 420 and also to an application computer (or analysis and display component) 450 via a datalink 452 (e.g. an Ethernet connection). Running on the application computer 450 is closed-loop feedback control software 413 that has been tuned for the purpose of providing vehicle stabilization and recovery from external disturbances. Some embodiments of the motion capture system 420 may contain a camera signal collection and processing unit 404, which collects real-time image information from all instances of the motion capture cameras 424, processes the data, and sends the information along a dedicated connection to the motion capture processing computer 402. The motion capture processing computer 402 and the application computer 450 can be combined in an alternate embodiment of this invention. A controllable device, such as a remotely-controlled vehicle 410, is positioned within a control (or capture) volume 422 monitored by the motion capture system 420. The controllable device 410 may be a vehicle, such as a manned or unmanned aerial vehicle (UAV), a ground vehicle, a water-based vehicle, or any other suitable type of vehicle, a manufacturing robot, or any other type of continuously controllable device. Furthermore, the controllable device 410 may be powered by any suitable energy source, including battery, solar, gas, and fuel-cell powered devices.

The motion capture system 420 includes a plurality of motion capture devices 424 (e.g. cameras) operatively distributed about the control volume 422 and configured to monitor the positions and movements of a plurality of retro-reflective markers 426 disposed on the vehicle 410. The retro-reflective markers 426, which reflect light back to the source (in this case, the motion capture camera units 424 which can carry their own light source), can be comprised of various shapes, including tape, spheres, semi or half spheres, or any other suitable shapes. In the embodiment shown in FIG. 1, the motion capture devices 424 operate in the visible portion of the spectrum, however, in alternate embodiments, devices that operate in other portions of the spectrum (e.g. near infrared, infrared, etc.) may be used. The motion capture devices 424 are configured to monitor the retro-reflective markers 426 and to export the positions of the retro-reflective markers 426 to the signal processing unit 404 and to the motion capture processing computer 402 in real-time. Alternately, using a priori knowledge of the positions of the retro-reflective markers 426 on the vehicle 410, the motion capture devices 424 or the motion capture processing computer 402 may internally process the measured marker position data to derive position and orientation data of the vehicle 410, and may output the position and orientation data of the vehicle 410 to the application computer 450.

In one particular embodiment, a total of six motion capture devices 424 are distributed about an approximately room-sized control volume 422 (e.g. 25'×25'×8') and are configured to provide sub-millimeter position accuracy of the positions of the retro-reflective markers 426 at refresh rates of up to 500 Hz. In another embodiment, the motion capture devices 424 include correlated motion measurement systems having sub-centimeter positional accuracies, update frequencies of at least 20 Hz, and latency periods of $\frac{1}{20}^{th}$ second or less.

Thus, the motion capture system 420 may provide six degree-of-freedom motion tracking of the vehicle 410 in approximately real-time to enable closed-loop feedback control of the position, movement, and stabilization characteristics of the vehicle 410. In alternate embodiments, any suitable number of motion capture devices 424 (e.g. two or more) may be used, and the control volume 422 may be scaled up or down to any desired size. Similarly, in alternate embodiments, the motion capture devices 424 may be configured to provide any suitable or desired resolution and operational frequency. In one particular embodiment, an update rate of 50 Hz and accuracy of 1 mm was found to provide an electrical RC helicopter system (FIG. 5) with a mass of 240 g, stable control and sufficiently fast recovery from external disturbances. The same vehicle was also shown to have stable performance at 20 Hz update rates, but with slower recovery from disturbances. Suitable motion capture devices 424 that may be used in the motion capture system 420 include those devices commercially available from Vicon Limited of Oxford, UK, as well as motion capture systems commercially available from Motion Analysis Corp. of Santa Rosa, Calif.

As further shown in FIG. 1, the application computer 450 operatively communicates with the controllable device 410 via a communication link 405, which may be a wireless link, wire-based link, fiber-optic link, or any other suitable type of communication link. The communication link 405 carries signals and data between the application computer 450 and the controllable device 410. In an alternate embodiment, the application computer 450 is configured to receive video, sensor signals, and other telemetry from the controllable device 410, and to transmit appropriate command signals 405 to the controllable device 410. A command and control software program 413 may be implemented on the application computer 450 to perform a variety of functions associated with monitoring and controlling the controllable device 410 and the various components of the control system 400. Alternately, the application computer 450 may include one or more programmable hardware components configured to perform one or more of these functions. The control software program 413 and the application computer 450 (or alternatively, on-board processor 414) could be combined by programming the control application algorithm into firmware.

In operation, the application computer 450 causes appropriate command signals 405 to be transmitted to one or more controllable devices 410, directing the one or more controllable devices 410 to perform desired activities or functions. For example, if the controllable device 410 is a flight vehicle, the command signals 405 may direct the flight vehicle to fly in a desired flight path and to collect desired information using on-board sensors. Similarly, a ground or water-based vehicle may be directed to traverse a desired path, collect information, or perform other desired activities. For those embodiments having a plurality of controllable devices 410, the controllable devices 410 may be commanded to move independently of one another, or alternately, two or more of the controllable devices 410 may be commanded to move in a coordinated manner, such as in flocking or swarming movements, as described more fully, for example, in *Beyond Swarm Intelligence: The Ultraswarm*, presented at the IEEE Swarm Intelligence Symposium by Holland et al., Jun. 8, 2005, incorporated herein by reference.

Using the real-time data export capability of the motion capture devices 424, position and orientation information is sent to the command and control software program 413 or other suitable control application or component. The position and orientation data provided by the motion capture devices 424 are differentiated to get velocity and angular velocity (both of which may also be filtered to reduce noise) for each degree-of-freedom. Position, orientation, linear and angular velocity data is then converted into vehicle coordinates (by using 4×4 homogeneous transformation matrix multiplication) and used to calculate error signals, which are then multiplied by feedback gain values, and then used to generate the actuator control values for the vehicle servo actuators.

Next, the actuator control values determined by the control application (e.g. the command and control software 413 on the application computer 450) are converted into a format needed by a communication link 405 between the control application and the vehicle 410. In one particular embodiment shown in FIG. 7, the conversion happens through the use of an analog 72 MHz RC (remote control) transmitter 657 having a "trainer" port which connects to the application computer 450 using a signal converter unit 655 and a USB or serial connection 409 In another specific embodiment, a USB-based, pulse-position-modulation (PPM) servo controller converter 655 is used for PC (personal computer) to RC data conversion, such as those converters commercially available from TTI, Inc. of Fremont, Calif. In alternate embodiments, any suitable analog or digital transmitter devices and converters may be used.

Figure 6:
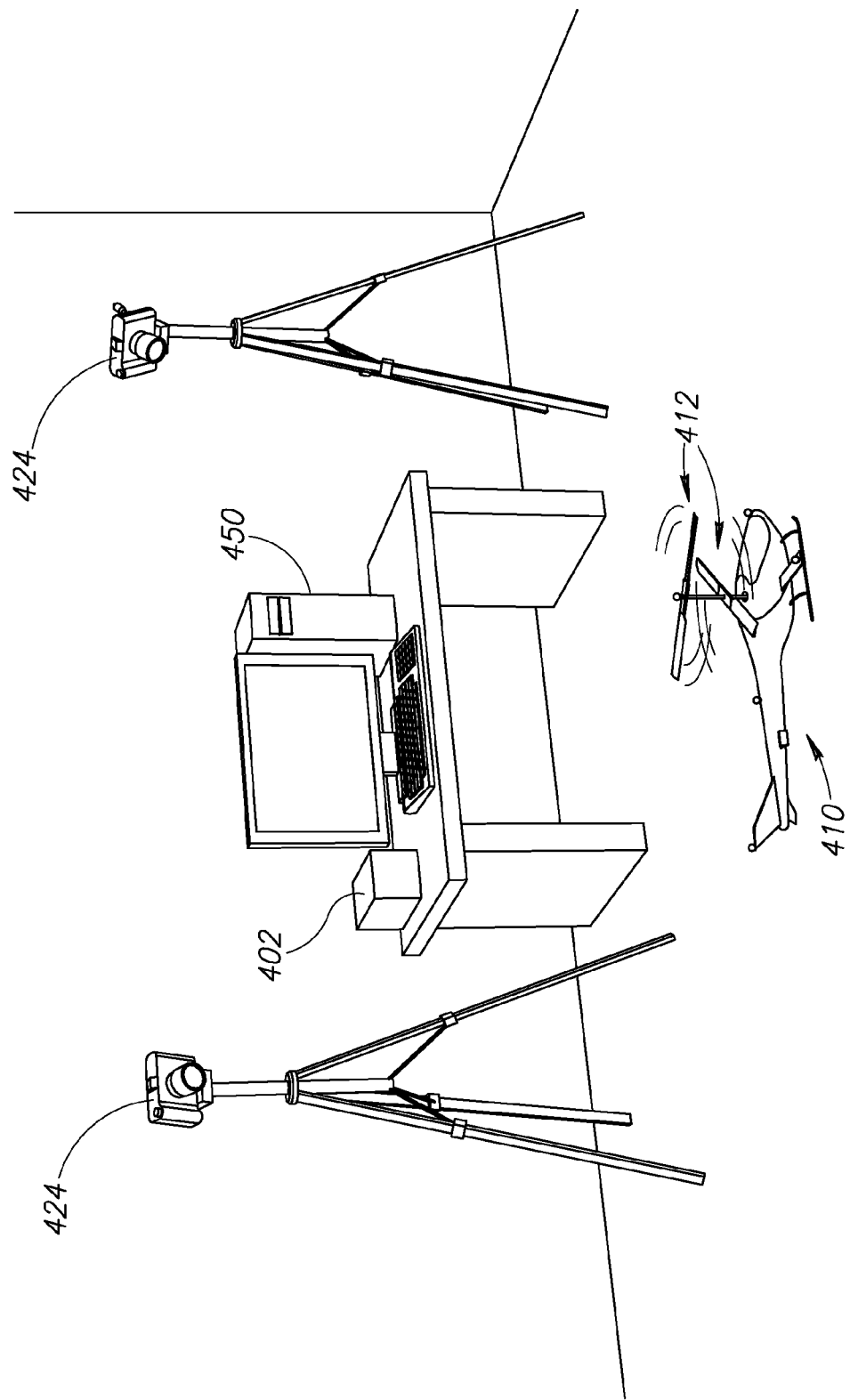
FIG. 6 is a partial view of the motion capture and control system in operation with the flight vehicle of FIG. 1.
Figure 7:
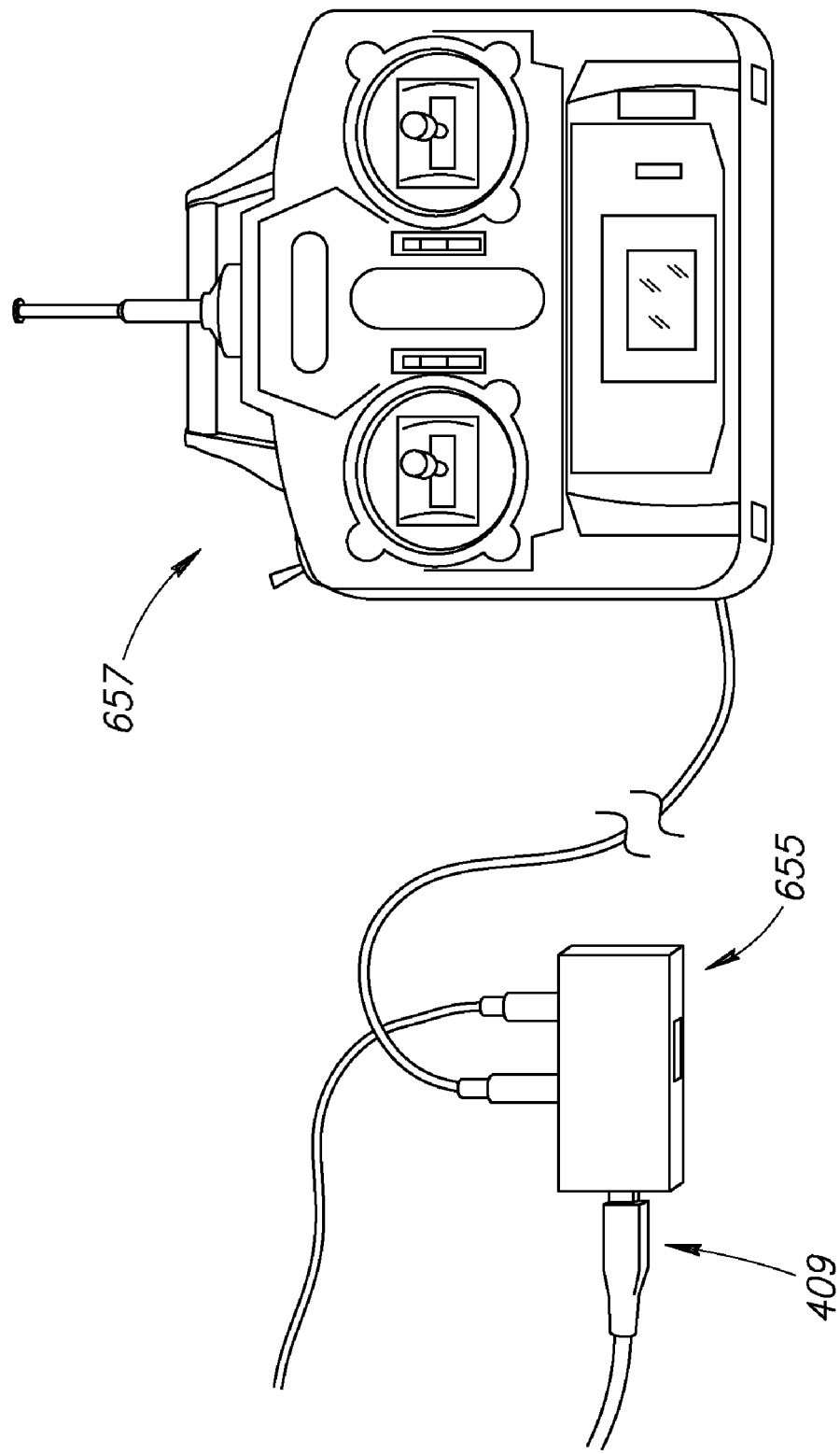
FIG. 7 is a view of the RC transmitter and computer USB interface unit for the control system of FIG. 1.

During movement of the controllable device 410 within the control space 422, as shown in FIG. 6, the motion capture system 420 tracks the positions of the retro-reflective markers 426 on the controllable device 410 and generates a representation of the position and orientation (quaternion or 4×4 homogeneous transformation matrix) of a particular grouping of retro-reflective markers 426. The various controllable devices and other objects in the environment are identified by the motion capture system 420 based on the unique pattern of retro-reflective marker placements on each object. The control software 413 running on the application computer 450 compares the position and orientation feedback information with the desired positions of the controllable device 410, determines the desired actuator inputs for controlling the movement of the vehicle 410 and causes appropriate command signals 408 to be transmitted to the controllable device 410 via the communication link 405 to controllably adjust (or maintain) the positions and velocities of the controllable device 410 in its desired positions or along its desired headings at the desired rates of movement.

Thus, the motion capture system 420 provides the control system 400 with the position and orientation information needed for a closed-loop feedback control capability for adjusting the positions and movements of the controllable device 410. More specifically, the motion capture system 420 may advantageously provide position and orientation feedback information that enables the application computer 450 to determine and control not only Cartesian positions (x, y, z), but also orientation (roll, pitch, yaw) control commands for proper control and stabilization of the controllable device 410.

Figure 3:
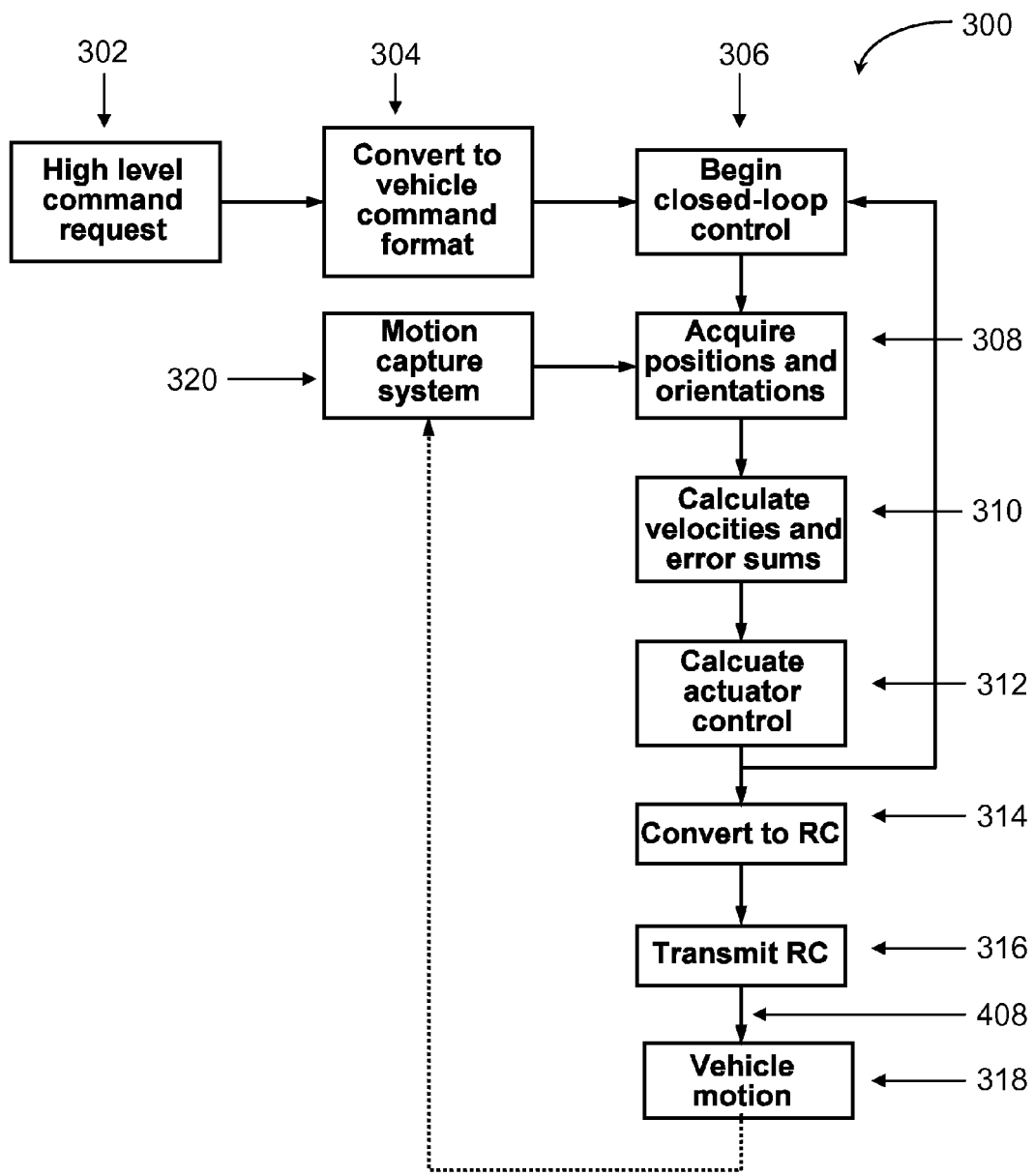
FIG. 3 is a flowchart of a measurement and control method for controlling one or more vehicles using the control system in accordance with another embodiment of the invention.

FIG. 3 is a flowchart of a control method 300 for controlling one or more vehicles 410 using the control system 400 of FIGS. 1 and 2. In this embodiment, the method includes providing a high-level command request at a block 302, which may come from a human operator, an autonomous agent, or another higher-level source. The high-level command request is converted to a properly formatted vehicle command (e.g. state vector $x_{set}$ of FIG. 2) at a block 304. A closed-loop feedback control loop begins at a block 306, at which the vehicle-formatted command request is received. Next, at a block 308, one or more positions and orientations of the one or more vehicles 410 are acquired. Initially, the one or more positions and orientations may be known, such as from inputs or initial conditions during start up of the method 300, or may be determined by the position reference system 420 (e.g. at a block 320) and input to block 308. The control loop in FIG. 3 is the implementation of the basic feedback control method described in FIG. 2, and is responsible for maintaining the desired trajectory and recovering from unexpected disturbances.

At a block 310, the method 300 determines the velocities by differentiating and filtering the positions and orientations. This data, along with the position and orientation data, is use to determine the state error (e.g. $x_{err}$ of FIG. 2) by comparing the one or more positions and orientations of the one or more vehicles with the vehicle-formatted command (e.g. $x_{set}$ of FIG. 2). Appropriate actuator control signals are determined at a block 312 based on the comparisons at block 310 using one of many possible feedback control techniques. In one embodiment, a proportional, derivative, integral (PID) control method is used. This method applies a set of feedback control gains (K in FIG. 2) to the state vector errors ($x_{err}$ of FIG. 2) to determine the control signals sent to the controlled device (or *Plant*) 410. Additional embodiments may use other control techniques that use the current system state or predicted state for feedback control (e.g., Pole-placement, LQR). In addition, data multiple types of position, velocity, or acceleration measurement systems could be combined with the motion capture data to give a more accurate estimate of the state (e.g., Kalman filter). At a block 314, the determined actuator control signals are converted to RC (remote control) signals, and the RC signals are transmitted to the vehicle 410 at a block 316. Multiple instances of method 300 can be run simultaneously to control one or more additional controlled devices from the same application computer 450 or one or more application computers 652, as shown in an alternate embodiment of FIG. 8.

As further shown in FIG. 3, the vehicle 410 moves in response to the RC signals at a block 318. The positions and velocities of the vehicle 410 are monitored and measured by the position reference system 420 at a block 320. The method 300 then returns to block 308, where the measured positions and velocities are updated and the above-described actions described in blocks 308 through 320 are repeated indefinitely. In this way, the method 300 uses the motion capture system 420 to provide position and orientation data for closed-loop feedback control of the controlled device 410.

Figure 4:
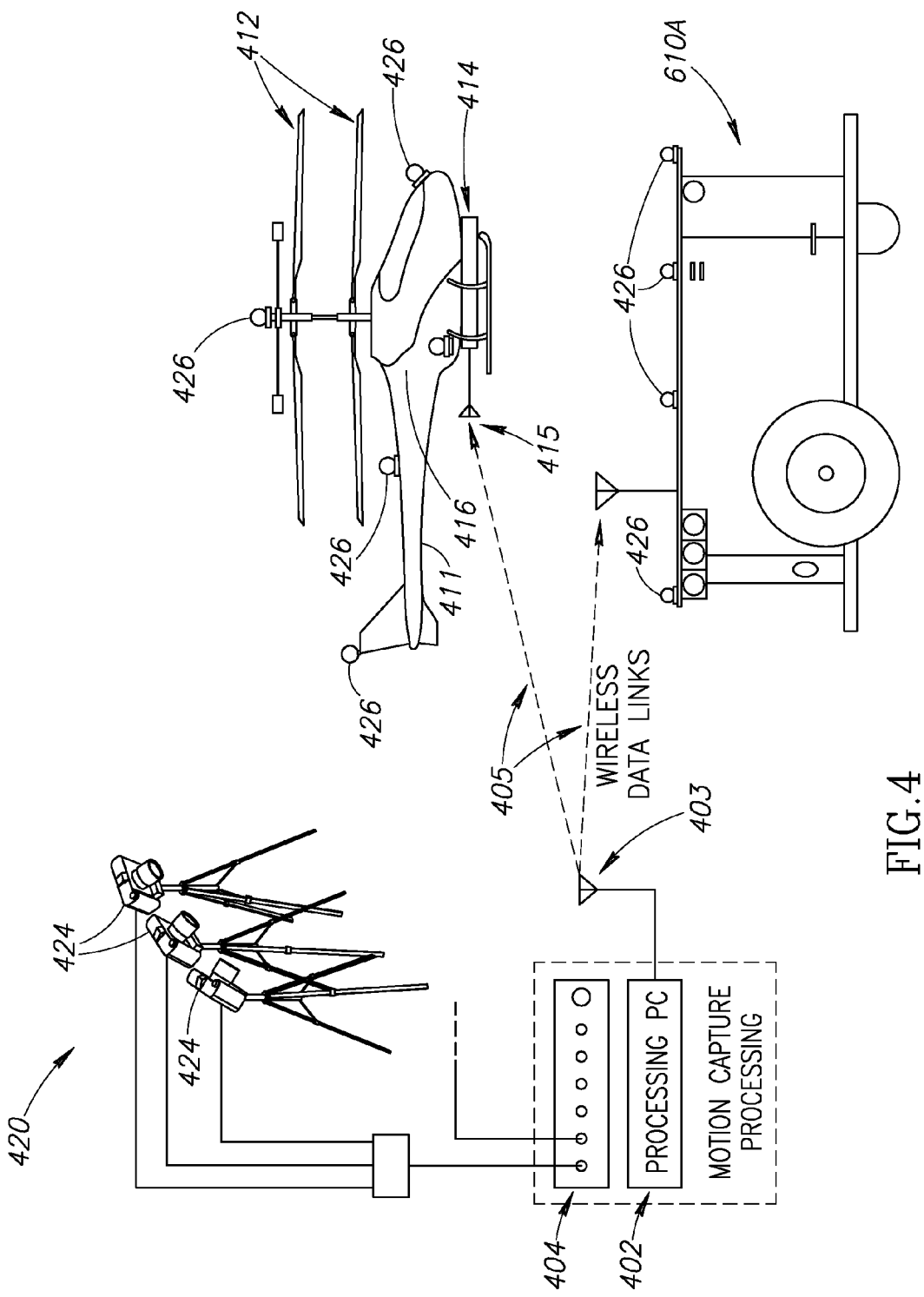
FIG. 4 is a schematic view of an alternate embodiment of a control system having vehicles that include an onboard application computer (embedded PC)
Figure 5:
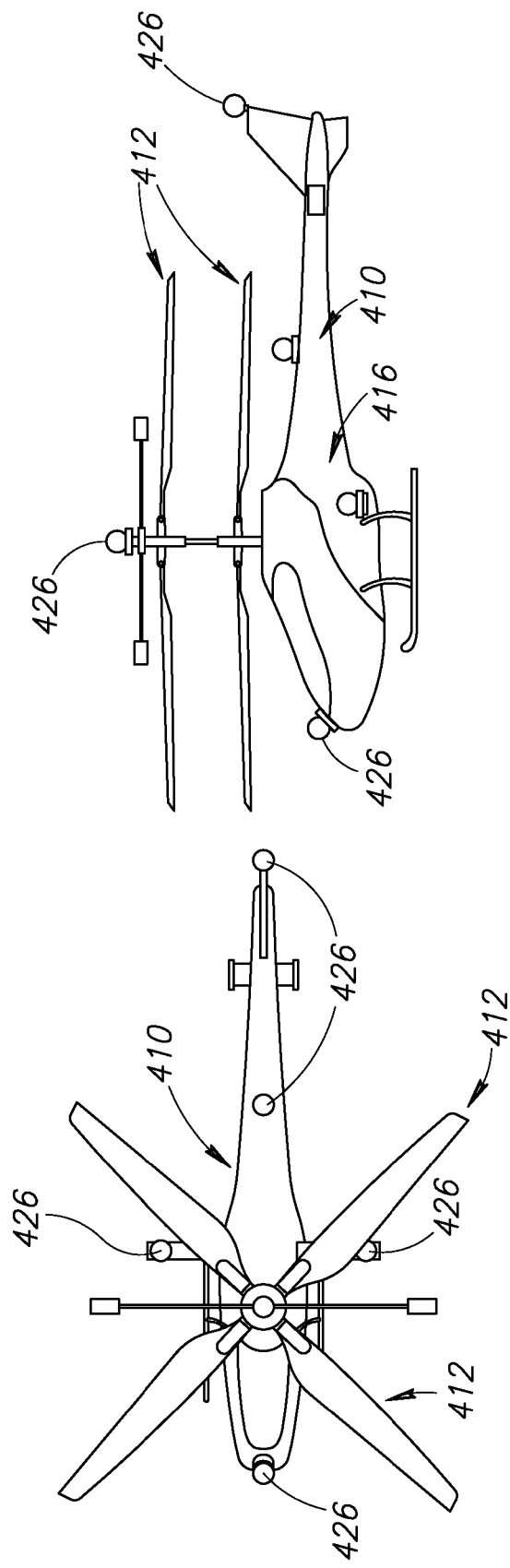
FIG. 5 is a top and side view of the flight vehicle of FIG. 1.

FIG. 4 shows the control system 400 in operation with a flight vehicle 411 in accordance with one particular embodiment of the invention. FIG. 6 is a partial view of the control system 400 in operation with the flight vehicle 410 of FIG. 1, where the off-board application computer is outside of the shot and not shown. A similar configuration is also possible in the embodiment described in FIG. 4 with the processing computer on-board the vehicle itself. As shown in FIG. 4, in this embodiment, the flight vehicle 411 includes an on-board controller 414 operatively coupled to a plurality of rotor assemblies 412 and to a power source 416 (e.g. a battery) (not visible). In one particular embodiment, the flight vehicle 410 is a modified version of an E-flite Blade CX 180 RC helicopter commercially available from Horizon Hobby, Inc. of Champaign, Ill. In another embodiment, the flight vehicle 410 is a modified version of a Draganflyer RC helicopter commercially available from Draganfly Innovations, Inc. of Saskatoon, Saskatchewan.

The on-board controller and processing component 414 includes a control module which may be located on the flight vehicle 411, or alternately, may be positioned remotely from the flight vehicle 411 and may communicate with the on-board controller 414 via a wireless communication link. In a particular embodiment, the processing component 414 may be a Robostix microcontroller and the communication component may be a Connex 400 xm-bt platform, both of which are commercially available from Gumstix Inc. of Portola Valley, Calif.

In the embodiment shown in FIG. 4, the on-board controller 414 includes a communication component 415 adapted to communicate with a communication component 403 of a motion capture processing unit 402. Thus, the communication component 415 receives the motion capture information provided by the motion capture system 420, provides these data to the on-board controller 414, which then determines and transmits the appropriately-formatted actuator control signals to the vehicle 411, thereby eliminating the separate RC transmitter 407 (FIG. 1). In one particular embodiment, the communication components 403, 415 are configured to communicate using the Bluetooth® short range wireless communication standard established by Bluetooth SIG, Inc. of Bellevue, Wash. In alternate embodiments, the communication components 403, 415 may use the 802.11 wireless communication standard developed by the Institute of Electrical and Electronics Engineers, or any other suitable communications standards or protocols.

Embodiments of systems and methods in accordance with the present invention may provide significant advantages over the prior art. For example, because control systems in accordance with the present invention only require passive retro-reflective markers 426 to be placed on the controllable device, while the motion detection devices 424 of the motion capture system 420 are positioned remotely from the controllable device, embodiments of the present invention may provide substantial weight advantages over prior art systems that require on-board cameras, active markers, or other navigational components. Embodiments of the present invention may also be readily scaled to larger systems having larger control volumes 422, and may be upgraded to have greater capability to control greater numbers of controllable devices.

It will be appreciated that various modules and techniques may be described herein in the general context of computer-executable instructions, such as program modules, executed by one or more computers or other devices. Generally, program modules include routines, programs, objects, components, data structures, and so forth for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

The application computer 450, or another environment monitoring computer, can be used to display position, orientation, and other telemetry data of the controlled device 410 or 411. Desired trajectory as well as the actual trajectory can be plotted in near real-time. Other obstacles and constraints can also be displayed, as well as derived data from the control or measurement systems.

Figure 8:
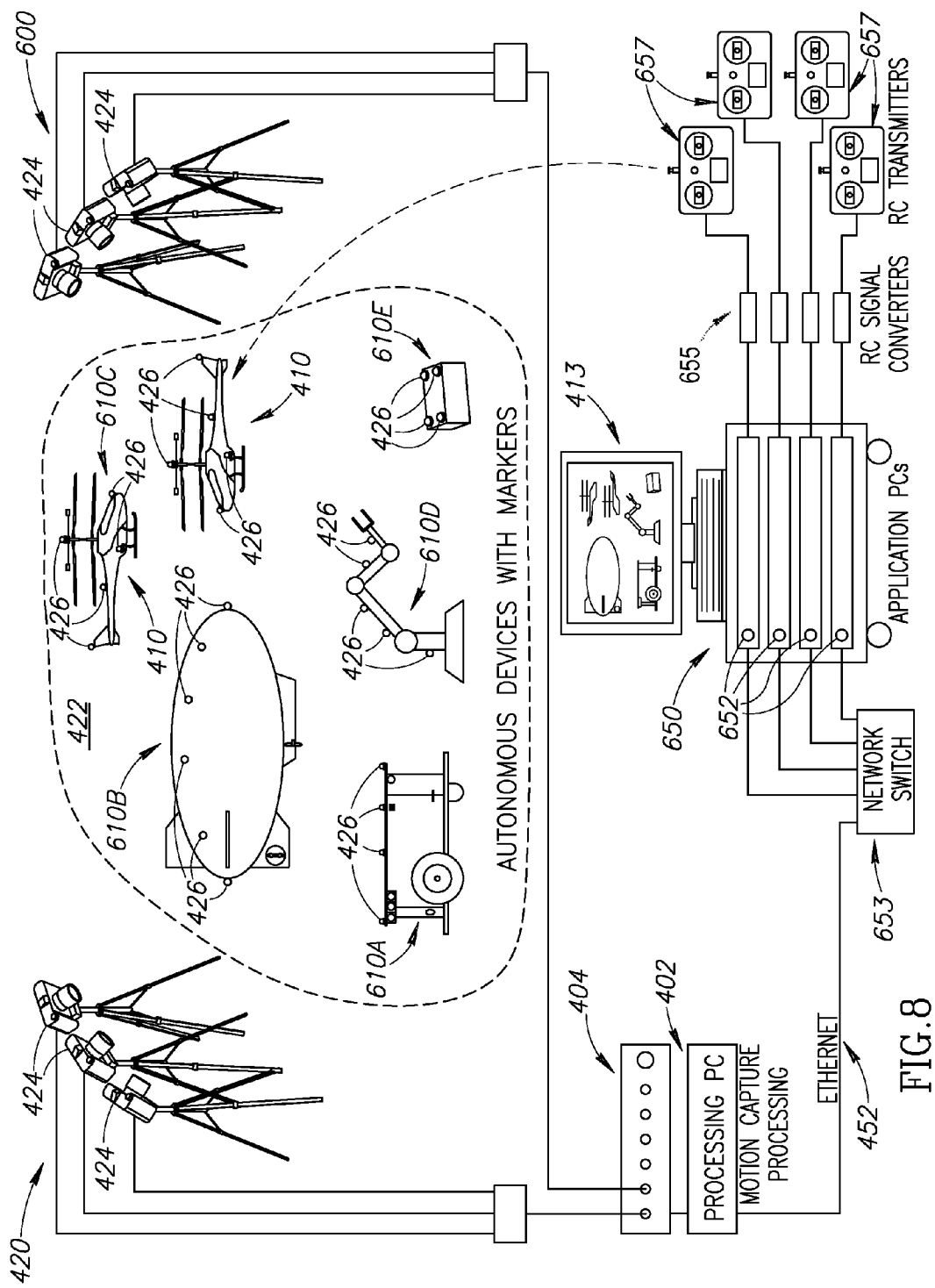
FIG. 8 is a schematic view of a control system in accordance with another embodiment of the invention.

FIG. 8 is a schematic view of a control system 600 in accordance with another embodiment of the invention. It will be appreciated that several of the components of the control system 600 are substantially the same as the corresponding components described above in accordance with FIG. 1, and therefore, for the sake of brevity, such components will not be described in detail again. In the embodiment shown in FIG. 8, the control system 600 is configured to simultaneously monitor and control a plurality of controllable devices 610. More specifically, the motion capture system 420 monitors a control volume 422 that includes a ground vehicle 610A, a blimp (or lighter-than-air vehicle) 610B, and a plurality of helicopters 610C, robot arms 610D, and other controllable objects 610E. Of course, in alternate embodiments, any other suitable controllable devices may be used.

Each of the controllable devices 610 is configured with a plurality of retro-reflective markers 426 that are monitored and tracked by the control system 600 as described above. The retro-reflective markers 426 (or other suitable marking devices) may be placed in different patterns on the controllable devices 610 to enable the motion capture system 420 to identify and distinguish between the individual controllable devices 610.

As further shown in FIG. 8, in this embodiment, an analysis and control component 650 includes a plurality of application processors 652 that are coupled to the motion capture processing computer 402 via a network switch 653. Each application processor 652 receives the outputs from the motion capture processing computer 402 (e.g. the position and orientation data provided by the position reference system 420), performs any necessary filtering, buffering, signal amplification, or other desired functions, and transmits the control signal data to a corresponding RC signal converter 655. The RC signal converter 655 performs the conversion of the control signals to a format suitable for transmission to the controllable devices 610 as described above, and communicates the properly formatted control signals to the corresponding RC transmitter 657 for transmission to the corresponding controllable devices 610 by way of the transmitter's "trainer" port (on 657 in FIG. 7).

In a further embodiment, the motion capture information provided by the motion capture system 420 may be broadcast to one or more control components of the control system 600, such as the software 413 implemented on the application computer 450, for determination of the range and speed of each object, including any actions that may be needed to avoid collisions. The motion capture system 420 does not decide what the individual vehicles should do to maintain the desired positions or courses, or to avoid collisions.

A variation of this concept, which may be considered to be a type of "location service", that can be generated by a separate application computer. The information provided by the system would be analogous to the RADAR-based systems used in air traffic management. In addition to vehicle position and altitude, this system could also provide vehicle identification, velocity, and heading.

In alternate embodiments, each controllable device 610 may receive the motion capture information directly from the motion capture system 420 and may have an on-board processor with sufficient on-board processing capacity to compute its own control signals to determine its own positions and movements, as described above with respect to FIG. 4. In such embodiments, the motion capture system 420 may broadcast the motion capture information for one or more (e.g. all) of the controllable devices 610 within the control volume 422 to one or more (e.g. all) of the controllable devices 610, and leave it to the on-board controller of each controllable device 610 to analyze the motion capture information and determine what should be done to avoid collisions. In further embodiments, the on-board controller of each controllable device 610 may be configured to communicate with other on-board controllers on other controllable devices 610 to perform the determinations necessary to avoid collisions or to cooperatively perform the desired mission.

Figure 9:
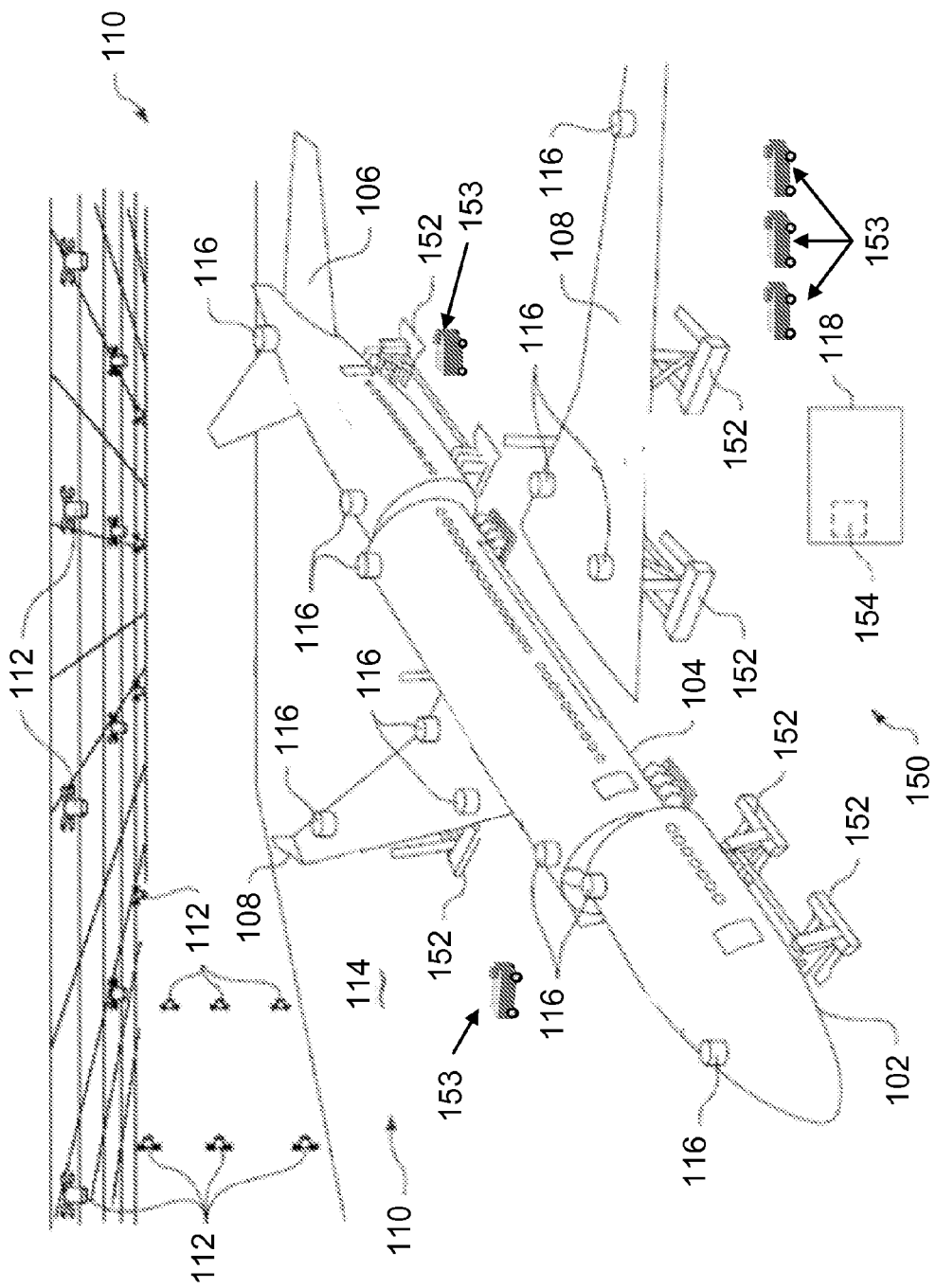
FIGS. 9 and 10 are schematic views of a manufacturing system in accordance with an alternate embodiment of the invention.
Figure 10:
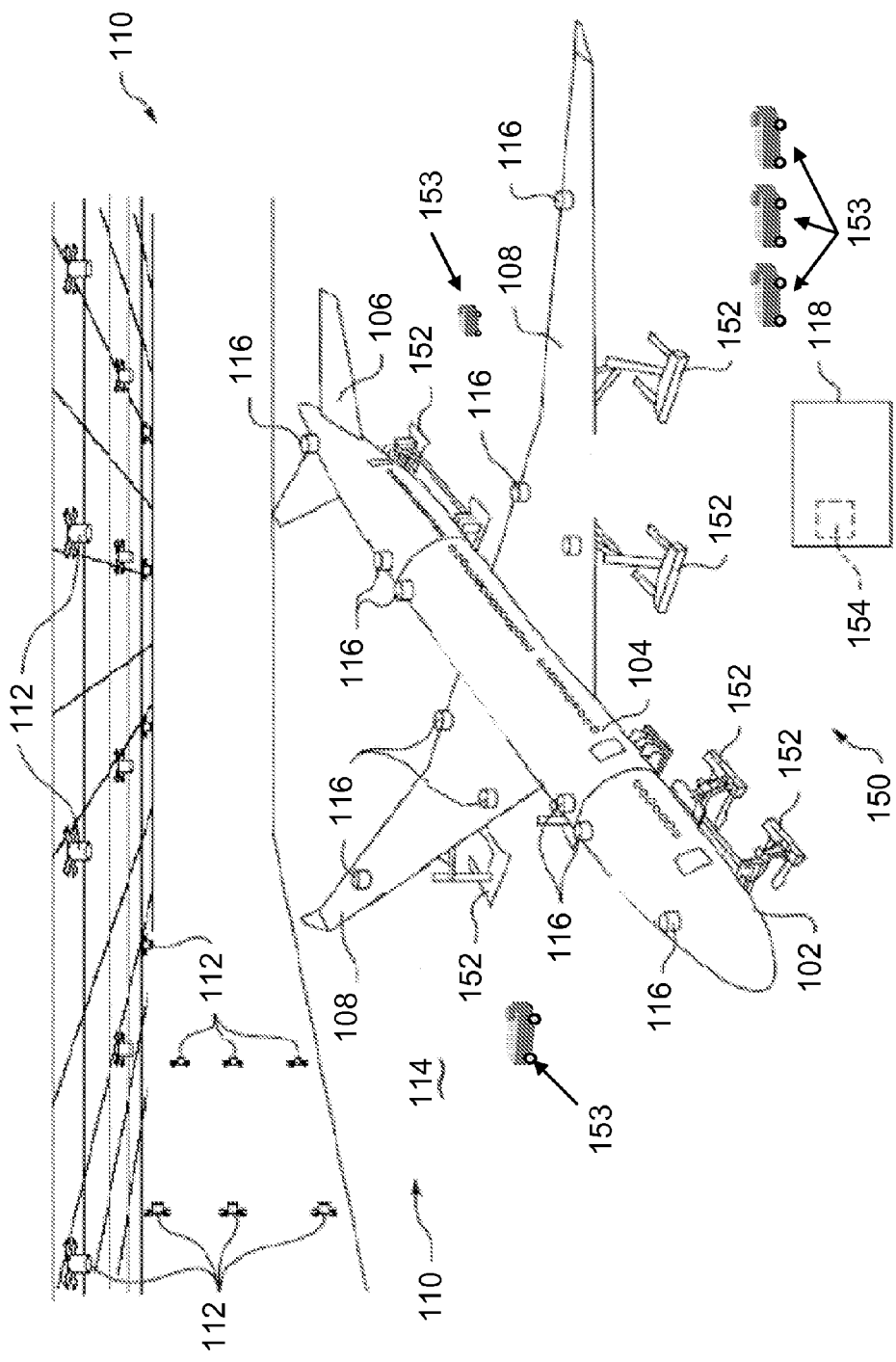

It will be appreciated that in further embodiments of the invention, the retro-reflective markers 426 need not be positioned directly on the controllable devices, but rather, may be positioned on objects or loads that are coupled to the controllable devices. For example, FIG. 9 is an isometric view of a plurality of disassembled aircraft components within a manufacturing system 100 in accordance with an alternate embodiment of the invention. Similarly, FIG. 10 is an isometric view of the manufacturing system 100 of FIG. 9 with the aircraft components in an assembled position. As shown in FIG. 9, in this embodiment, the aircraft components include a forward fuselage assembly 102, a mid-fuselage assembly 104, a tail assembly 106, and a pair of wing assemblies 108. Each of the aircraft components is borne by a remotely-controllable manufacturing robot 152 of a positioning system 150. The manufacturing robots 152 are operatively coupled (e.g. using wireless communication components) to a controller 154, and are adapted to support and move the aircraft components in accordance with command signals from the controller 154. The controller 154 may be an independent component, or alternately, as shown in FIG. 9, may be disposed within a data management computer 118 of the manufacturing system 100.

The manufacturing system 100 further includes a control system 110 having a plurality of motion capture devices 112 distributed about a working space 114, and a plurality of markers (e.g. retro-reflective markers) 116 located on the surfaces of the various components 102, 104, 106, 108. The motion capture devices 112 are operatively coupled to the controller 154 or to the data management computer 118 by wires, cables, or wireless communication components (not shown). As shown in FIG. 9, the positions of the aircraft components may be determined using different numbers of markers 116. Thus, relatively simple shapes may require only two markers 116 (e.g. fuselage components 102, 104) for proper position and orientation determination, while other relatively complex shapes (e.g. wing assemblies 108) may require three (or more) markers 116.

In operation, the motion capture devices 112 monitor and track the positions and orientations of the markers 116 on the aircraft components beginning in the disassembled stage of manufacturing (FIG. 9), and communicate this information to the controller 154. In turn, the controller 154 transmits appropriate control signals to the manufacturing robots 152 to position the aircraft components in the desired positions for final assembly (FIG. 10). Because the control system 110 may be configured to control the plurality of manufacturing robots 152 simultaneously, the positioning of the various aircraft components 102, 104, 106, 108 may be performed simultaneously (or consecutively), and may thereby provide improved manufacturing efficiency over prior art manufacturing systems.

It will be appreciated that manufacturing facilities in accordance with the present invention may be utilized to assemble a wide variety of aircraft, and that the invention is not limited to the particular embodiment of manufacturing facility 100, or to the assembly of the particular aircraft embodiment, shown in FIGS. 9 and 10. For example, while the aircraft shown in the accompanying figures is generally representative of a commercial passenger aircraft, including, for example, the 737, 747, 767, 777, and 787 models commercially-available from The Boeing Company of Chicago, Ill., the inventive systems and methods disclosed herein may also be employed in the assembly of virtually any other types of aircraft. More specifically, the teachings of the present invention may be applied to the manufacture and assembly of other passenger aircraft, fighter aircraft, cargo aircraft, rotary aircraft, and any other types of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference.

It will also be appreciated that manufacturing facilities in accordance with the present disclosure may be used to assemble a wide variety of other products. For example, in alternate embodiments, systems and methods in accordance with the invention may be employed in the manufacture of automobiles, recreational vehicles, ships, buildings, and virtually any other products that require the accurate assembly of components using controllable manufacturing machines. This concept can also be implemented to control additional support equipment 153, as shown in FIGS. 9 and 10, for delivery of components to manufacturing locations.

Figure 11:
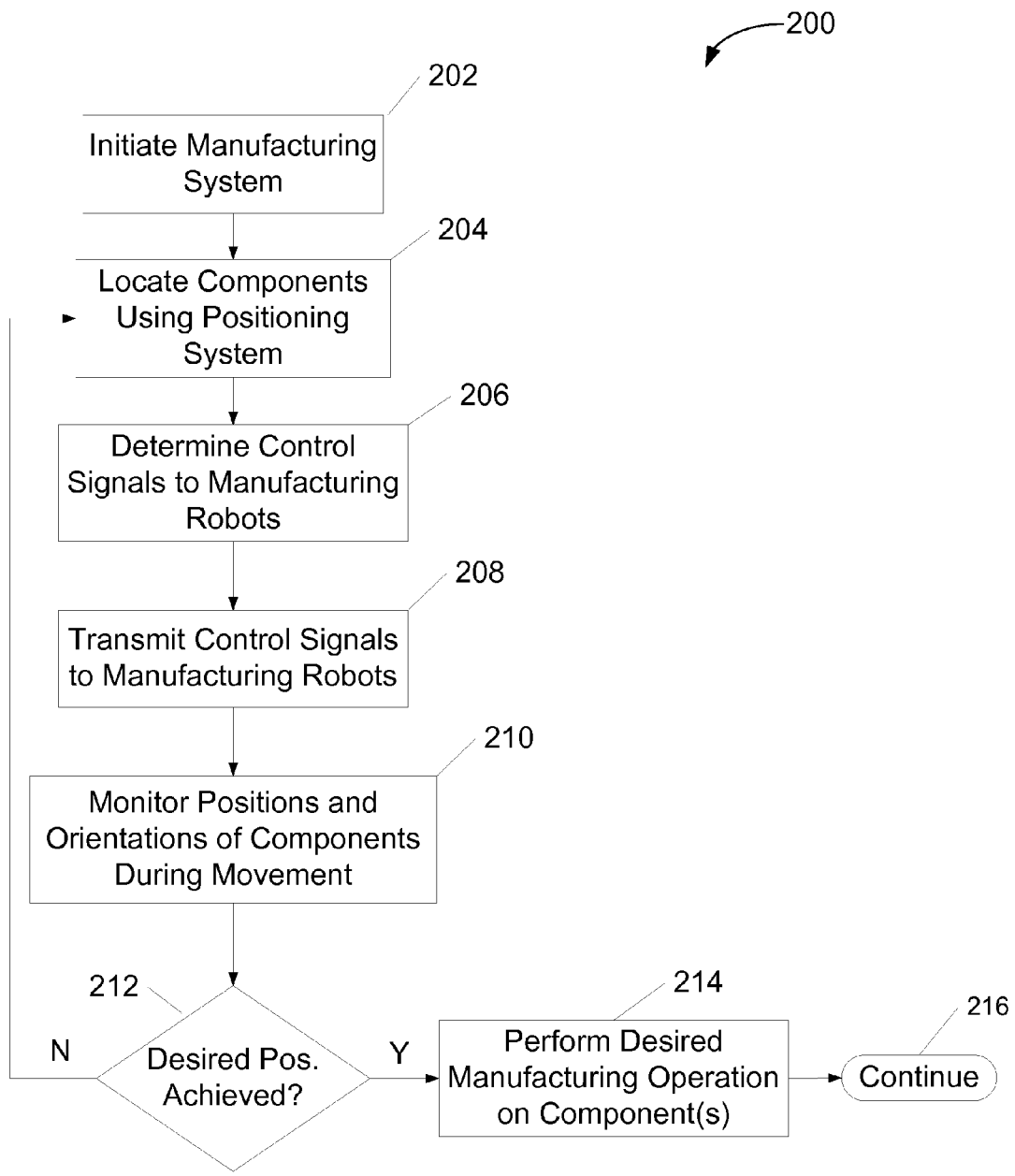
FIG. 11 is a flowchart of a method of performing a manufacturing operation in accordance with another alternate embodiment of the invention.

FIG. 11 is a flow chart showing a method 200 of performing a manufacturing operation in accordance with an embodiment of the present invention. In this embodiment, the manufacturing system 100 is initiated at a block 202, including the position system 110 and the control system 150. Next, the aircraft components within the control volume 114 are located by the positioning system 110 at a block 204. At a block 206, the control signals necessary for moving one or more of the components either partially or completely into a desired position are determined. At a block 208, the control signals are communicated to one or more of the manufacturing robots 152 to controllably move the one or more components into the desired position(s). At a block 210, the positioning system 110 monitors the positions and orientations of the components during movement by the manufacturing robots 152. At a block 212, a determination is made regarding whether all of the components have reached the desired final positions. If not, the method 200 returns to block 204 and the actions performed in blocks 204 through 210 are repeated until the components have reached the desired final positions. After the components have reached the desired final positions, the desired manufacturing operations (e.g. coupling of the components) is performed at a block 214, and the method 200 continues to other operations or terminates at block 216.

Additional degrees-of-freedom associated with parts on the controlled device that move relative to each other can also be measured and controlled using the motion capture hardware and the feedback control concepts presented in this disclosure. By using motion capture data and knowledge of the device kinematics, additional translational and rotational motions can be measured, converted into the appropriate coordinates and controlled through feedback control software. In certain embodiments, data from the motion capture system would be used to measure the relative linear and angular acceleration, velocity and position of moving parts attached to the controlled vehicles for the purpose of relative linear and angular acceleration, velocity and position feedback. Examples of these types of moving parts could include control surfaces, steerable sensors, propellers, rotors, fans, wheels, landing gear, doors, slings, and hoisting apparatus, and any other desired components. To enable tracking by the motion capture system, the parts need to carry the proper retro-reflective markers, like retro-reflective tape or retro-reflective balls or half balls, etc. Furthermore, the kinematic link between the body of the vehicle the moving part may need to be modeled in the reference model used by the motion capture system.

In further embodiments, data from the motion capture system would be used to measure the relative linear and angular acceleration, velocity and position of articulated apparatus formed of kinematically-linked moving parts, known as segments, attached to the controlled vehicles for the purpose of relative linear and angular acceleration, velocity and position feedback control or health monitoring. Such apparatus include robotic end-effectors, like robotic arms and grippers 610D (FIG. 8). By applying markers to a sufficient number of segments, and by modeling the kinematic chain of the apparatus in the reference model used by the motion capture system, proper control authority of the apparatus using the motion capture system may be achieved. For some embodiments, measurement using this type of system could be used in place of, or to augment, on-board sensors (e.g., encoders or tachometers).

In further embodiments, data from the motion capture system may be used to measure the absolute and relative linear and angular acceleration, velocity and position of detachable parts that are initially attached to and then deployed by the controlled vehicles. Such detachable parts may be ballistic, gliding, or self-propelled objects, and may be guided along a desired trajectory by their own control system using inputs provided by a motion capture system. To enable tracking by the motion capture system, these objects would be suitably equipped with proper markers, including the retro-reflective markers, retro-reflective tape, retro-reflective balls, half-balls, semi-spheres, or any other suitable shapes. Furthermore, such detachable parts would need to be modeled in a reference model used by the motion capture system to achieve adequate control authority.

Figure 12:
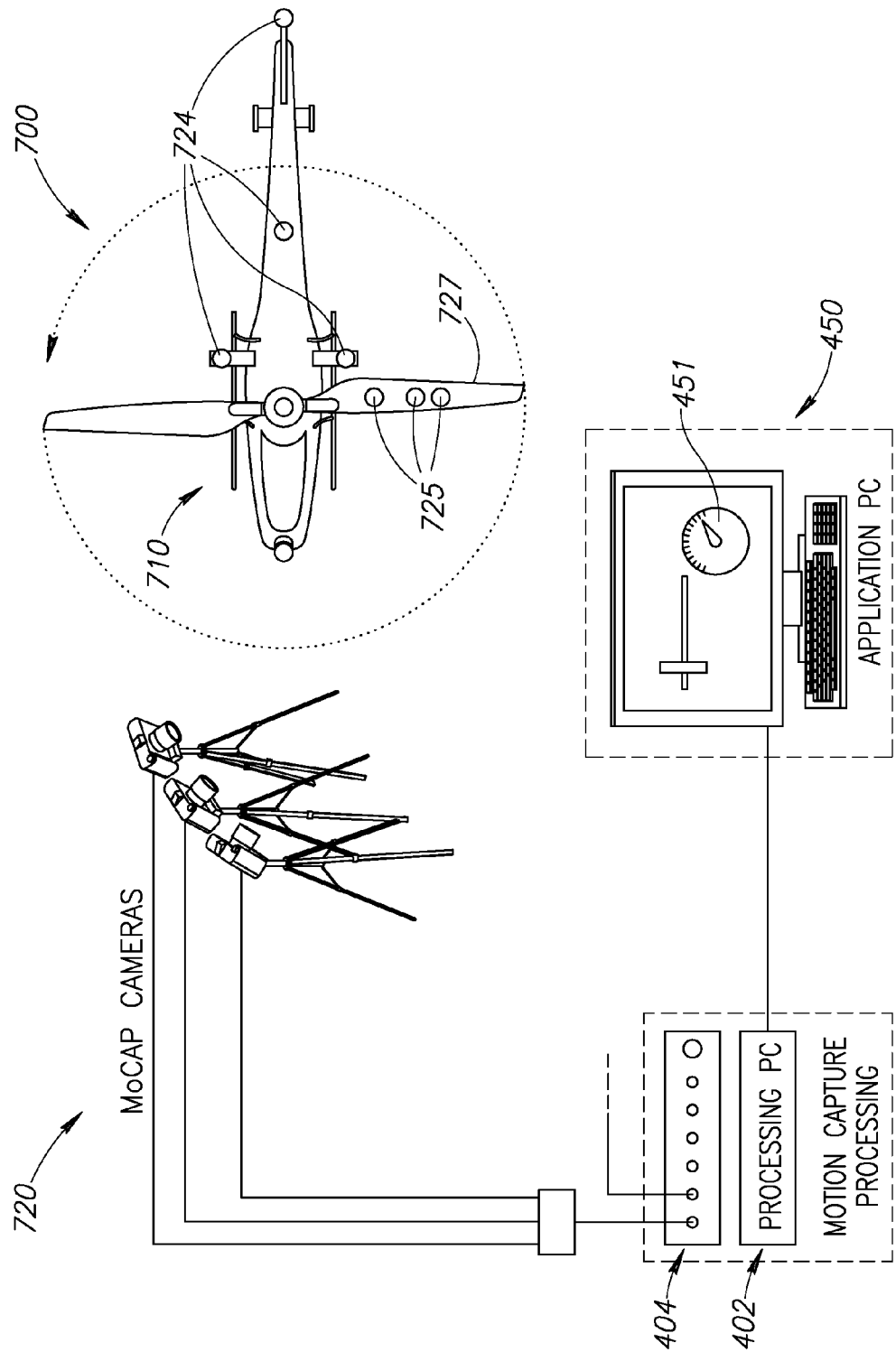
FIGS. 12 and 13 show control systems including a motion capture system for monitoring a controlled device having a plurality of secondary retro-reflective markers in accordance with further embodiments of the invention.
Figure 13:
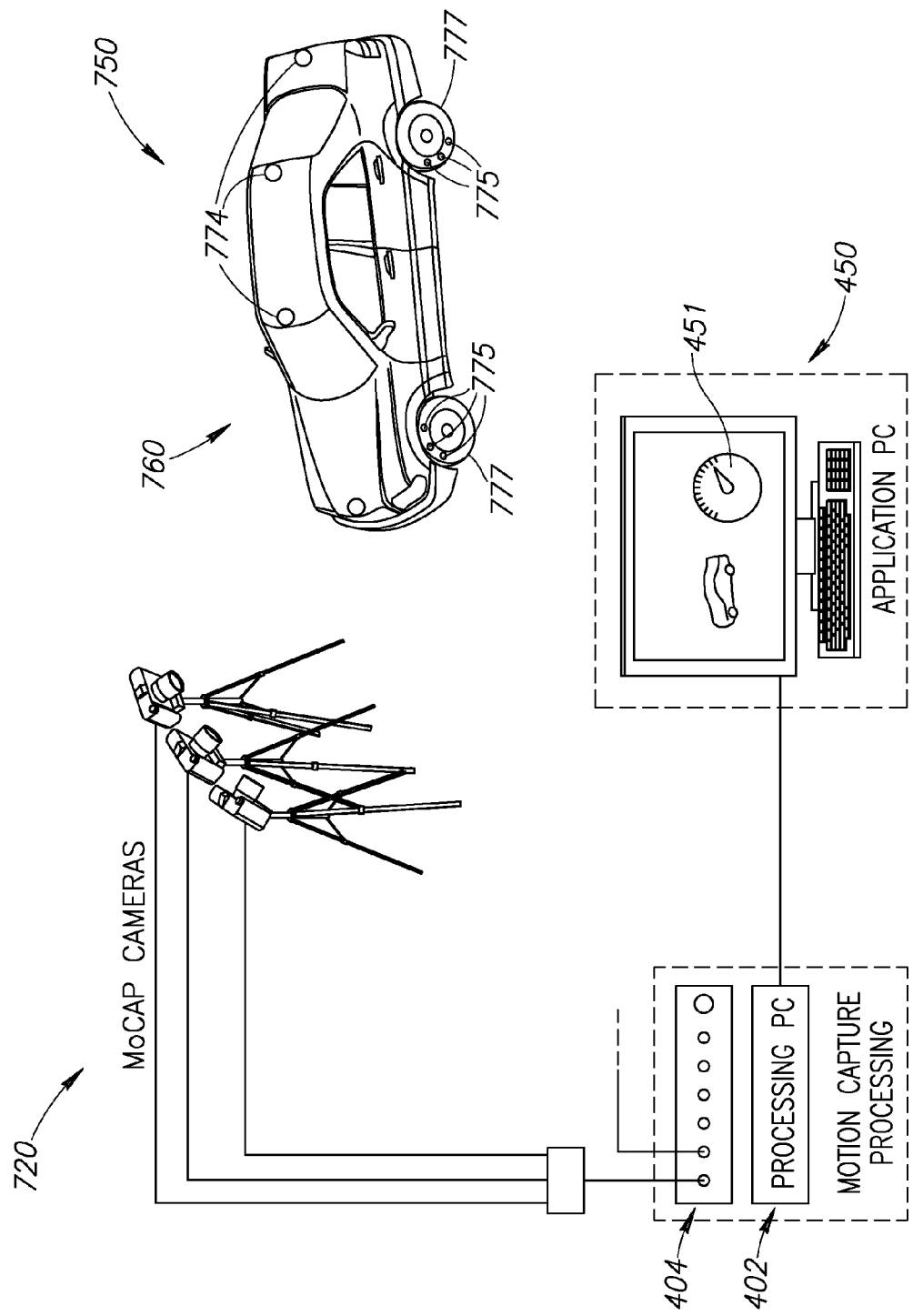

Still other embodiments of the invention may be used to measure moving components that remain attached to the controllable devices. For example, FIG. 12 shows a control system 700 including a motion capture system 720 for monitoring a rotary-powered flight vehicle 710. The flight vehicle 710 includes a plurality of retro-reflective markers 724 that enable the motion capture system 720 to track the flight vehicle 710, and a plurality of secondary retro-reflective markers 725 distributed on a rotor blade 727 of the flight vehicle 710. The secondary retro-reflective markers 725 enable the motion capture system 720 to measure various aspects of the rotor blade 727, such as angular velocity, forward velocity, pitch, etc. Similarly, FIG. 13 shows a control system 750 for monitoring a wheeled vehicle 760. The vehicle 760 includes a plurality of retro-reflective markers 774 that enable the motion capture system 720 to track the vehicle 760, and a plurality of secondary retro-reflective markers 775 distributed, with unique placement patterns, on wheels 777 of the vehicle 760 to measure various dynamic characteristics (e.g. angular velocity, forward velocity, etc.) of the wheels 777. In the embodiments shown in FIGS. 12 and 13, the software 413 on the application computer 450 includes graphical telemetry elements (e.g. tachometer) 451 to display additional data provided by the motion capture system 720. This secondary data can then be used by the control software to directly control the vehicle or the blade motion.

Figure 14:
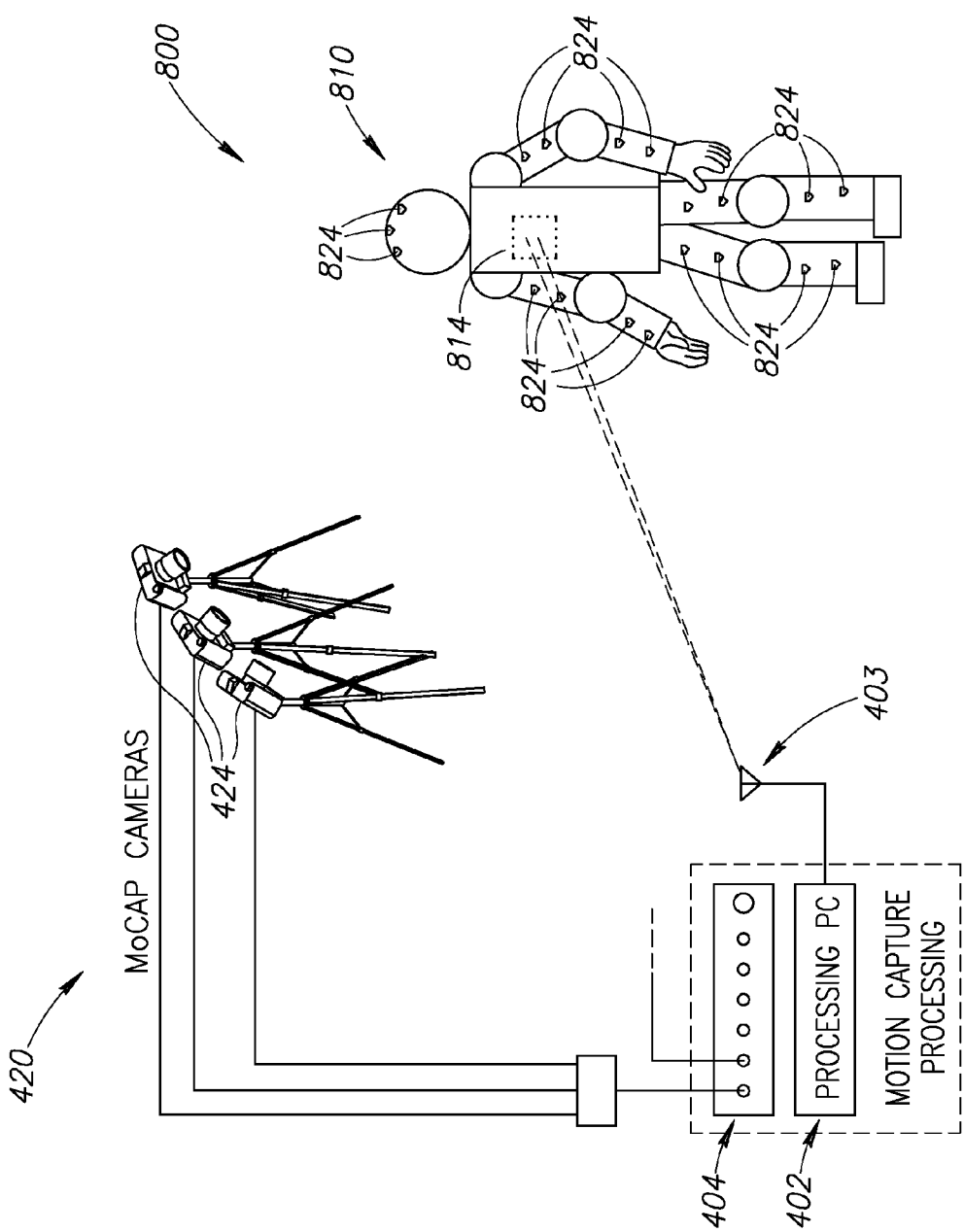
FIG. 14 is a control system including a motion capture system for a bi-pedal robotic device in accordance with yet another embodiment of the invention.

FIG. 14 shows a control system 800 including a motion capture system 820 for a bi-pedal robotic device 810 in accordance with yet another embodiment of the invention. The bi-pedal robotic device 810 includes an on-board controller 814 configured to determine and transmit control signals to various servo-motors, actuators, and other components to provide controlled movement of the bi-pedal robotic device 810. As described above with respect to FIG. 4, in this embodiment, the motion capture system 820 monitors a plurality of markers (e.g. retro-reflective markers) 824 disposed on the outer portions of the device 810, and transmits the measured motion capture data via a communication component 403 to the on-board controller 814. Of course, in alternate embodiments, the control system 800 may be configured to include an application computer 650 and one or more control units 657 as described above with respect to the system shown in FIG. 8.

The robotic device 810 may be a suitably modified version of a variety of known devices including, for example, the QRIO device developed by Sony Corporation of Tokyo, Japan, the ASIMO device developed by Honda Motor Co. Ltd. of Tokyo, Japan, and the RX bi-pedal robot developed by Robotis, Inc. of Seoul, South Korea. It will be appreciated, however, that embodiments of the invention are not limited to bi-pedal robotic devices, and that a wide variety of robotic devices may be suitably configured to operate in accordance with the teachings of the present disclosure. In further embodiments, control systems in accordance with the present invention may be used in conjunction with a wide variety of robotic devices other than bi-pedal devices including, for example, any devices based on the controlled servo technologies and devices commercially available from Robotis, Inc., or those robotic kits, toys, and assembled devices commercially available from The Lego Group of Billund, Denmark, or from Fisher-Price, Inc. of East Aurora, N.Y., or from RadioShack Corporation of Fort Worth, Tex.

Figure 15:
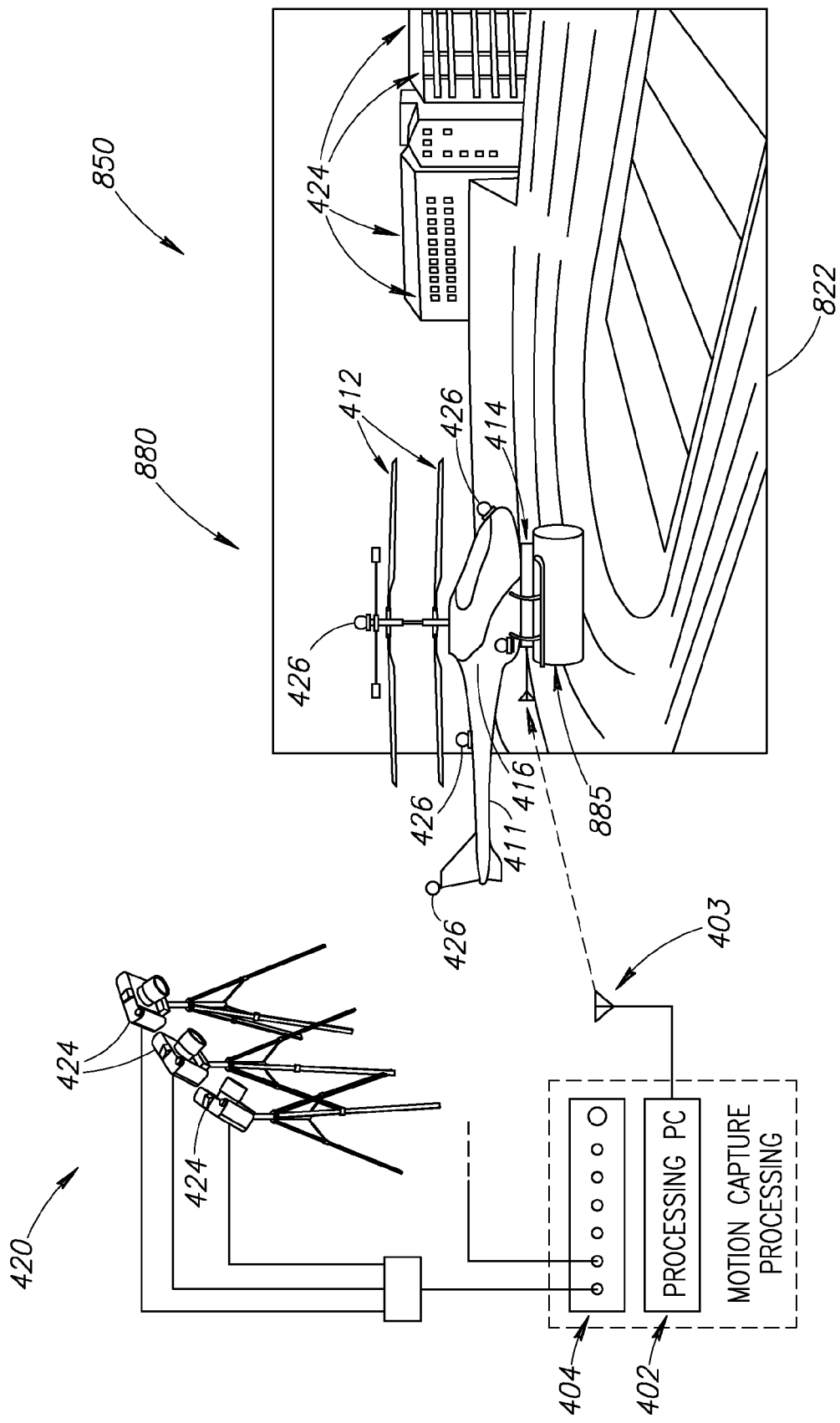
FIG. 15 is a control system for an air-borne viewing system in accordance with still another embodiment of the invention.

FIG. 15 is a control system 850 for an air-borne viewing system 880 in accordance with still another embodiment of the invention. The air-borne viewing system 880 includes a flight vehicle 410 and motion capture system 420 as described above with respect to the system shown in FIG. 4. In this embodiment, the control volume 822 includes a sports arena and a plurality of motion capture devices 424 are located about the control volume 822. A viewing device 885 is coupled to the flight vehicle 410 for viewing activities (e.g. sporting events, musical and theatrical performances, speeches, etc.) occurring within the control volume 822. The viewing device 885 may be a television camera for broadcasting images of the activities occurring within the control volume 822 to a television network, to a closed-circuit network (e.g. a screen within the sports arena, a security booth, a surveillance network, etc.), or to a data base for subsequent review and analysis. Thus, the air-borne viewing system 880 may advantageously provide a controllable, highly maneuverable platform from which to observe the activities occurring within the control volume 822.

Of course, embodiments of the invention are not limited to the particular embodiment described above and shown in FIG. 15. For example, in alternate embodiments, the control volume 822 may include a wide variety of facilities or environments, including theaters, meeting halls, arenas, golf courses, airports, shopping malls, or any other suitable environments or facilities. Similarly, in further embodiments, the control volume 822 may include hazardous work environments, such as construction sites, mines, nuclear reactor sites, tunnels, damaged structures, caves, chemical treatment facilities, or other potentially hazardous environments. Alternately, embodiments of systems and methods in accordance with the present invention may be used in underwater or submersible environments for controlling submersible vehicles, remotely-operated vehicles (ROVs), submarines, and the like. And in further embodiments, the viewing device 885 may be positioned on any type of controllable device, including a lighter-than-air vehicle, ground vehicle, manufacturing robot, bi-pedal robot, toy, or any other suitable device or platform.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A system for controlling one or more controllable devices, comprising:
   a motion capture system to measure one or more motion characteristics of one or more controllable devices as the one or more controllable devices are operating within a control volume, the one or more controllable devices having a plurality of retro-reflective markers positioned thereon in a pattern unique to each of the one or more controllable devices, the motion capture system including a plurality of motion detection devices operatively positioned with respect to the control volume to detect at least some of the retro-reflective markers positioned on the one or more controllable devices and to determine an orientation of each of the at least one controllable device based on a position of the retro-reflective markers;
   a processing component to receive the one or more motion characteristics from the motion capture system including the orientation of each of the at least one controllable devices, to compare the received motion characteristics with desired motion characteristics, and to determine a command signal based on the compared motion characteristics, wherein the processing component includes: (1) at least one communication network operatively coupled to the motion capture system to transmit the one or more motion characteristics measured by the motion capture system, and (2) an on-board processing component positioned on each of the one or more controllable devices, the on-board processing component to receive the one or more motion characteristics from the at least one communication network, and to determine the command signal; and
   a position control system to receive the command signal and to adjust at least one motion characteristic of the one or more controllable devices in a closed-loop feedback manner.

2. The system of claim 1, wherein the processing component includes:
   at least one communication network operatively coupled to the motion capture system;
   an application computer operatively coupled to the at least one communication network to compute the command signal; and
   one or more control modules operatively coupled to the at feast one communication network to receive the command signal, and to transmit the command signal to the one or more controllable devices.

3. The system of claim 2, wherein the one or more control modules recondition the command signal into a format suitable for use by the one or more controllable devices.

4. The system of claim 1, wherein the plurality of motion detection devices determine six-degree-of-freedom information for each of the controllable devices operating within the control volume.

5. The system of claim 1, wherein the plurality of motion detection devices comprise a plurality of motion detection cameras.

6. The system of claim 5, wherein the plurality of camera devices track the retro-reflective markers using at least one of a visible wavelength portion of the spectrum and an infrared wavelength portion of the spectrum.

7. The system of claim 1, wherein the plurality of motion detection devices track the one or more controllable devices based on plurality of retro-reflective markers positioned on each controllable device.

8. The system of claim 7, wherein the plurality of motion detection devices include multiple correlated motion measurement cameras that measure position to within approximately one centimeter accuracy, have update frequencies of at least 20 Hz, and have latency periods of $\frac{1}{20}$th second or less.

9. The system of claim 1, wherein a plurality of secondary passive reflector devices are positioned on a moveable component of at least some of the controllable devices, and wherein the plurality of motion detection devices track a secondary motion characteristic of the moveable component using the plurality of secondary passive reflector devices.

10. The system of claim 9, wherein the moveable component comprises a rotating component and the secondary motion characteristic comprises an angular velocity.

11. The system of claim 1, wherein the one or more controllable devices includes at least one of a vehicle, and a robot.

12. The system of claim 11, wherein the at least one vehicle includes at least one of a flight vehicle, a rotary-powered flight vehicle, a lighter-than-air flight vehicle, and a ground based vehicle.

13. A manufacturing system, comprising:
   at least one controllable device including a position control system to controllably position a workpiece;
   a plurality of retro-reflective markers positioned on the workpiece in a pattern unique to the type of workpiece;
   a motion capture system to repetitively measure one or more motion characteristics of the plurality of markers as the workpiece is controllably positioned within a control volume by the controllable device and to determine an orientation of the workpiece based on a position of the retro-reflective markers;
   a processing component to receive the one or more motion characteristics from the motion capture system and to determine at least one command signal based on the one or more motion characteristics, wherein the processing component includes: (1) at least one communication network operatively coupled to the motion capture system to transmit the one or more motion characteristics measured by the motion capture system, and (2) an on-board processing component positioned on the controllable device, the on-board processing component to receive the one or more motion characteristics from the at least one communication network and to compute the command signal; and
   wherein the position control system of the controllable device receives the command signal and adjusts at least one motion characteristic of the workpiece in a closed-loop feedback manner, the closed-loop feedback to compare the one or more motion characteristics with desired motion characteristics.

14. The system of claim 13, wherein the processing component includes:
at least one communication network operatively coupled to the motion capture system;
an application computer operatively coupled to the at least one communication network to compute the command signal; and
one or more control modules operatively coupled to the at least one communication network to receive the command signal, and to transmit the command signal to the position control system of the controllable device.

15. The system of claim 14, wherein the one or more control modules recondition the command signal into a format suitable for use by the position control system of the controllable device.

16. The system of claim 13, wherein the motion capture system includes a plurality of detection devices operatively positioned with respect to the control volume, the plurality of detection devices to determine six-degree-of-freedom information for the workpiece.

17. The system of claim 13, wherein the motion capture system includes a plurality of motion detection cameras to detect at least some of the retro-reflective markers positioned on the workpiece.

18. The system of claim 17, wherein the plurality of camera devices track the retro-reflective markers using at least one of a visible wavelength portion of the spectrum and an infrared wavelength portion of the spectrum.

19. The system of claim 13, wherein the controllable device comprises at least one of a vehicle, and a robot.

20. A viewing system, comprising:
at least one controllable device including a position control system to controllably position a viewing device, and a plurality of retro-reflective markers positioned on the controllable device;
a motion capture system to repetitively measure one or more motion characteristics of the controllable device as the controllable device is controllably positioned within a control volume, wherein measuring the one or more motion characteristics of the controllable device includes measuring an angular orientation of the controllable device based on the position of the plurality of retro-reflective markers; and
a processing component to receive the one or more motion characteristics from the motion capture system and to determine at feast one command signal based on the one or more motion characteristics, the controllable device to receive the command signal and to adjust at least one motion characteristic of the controllable device in a closed-loop feedback manner, wherein the processing component includes: (1) at least one communication network operatively coupled to the motion capture system to transmit the one or more motion characteristics measured by the motion capture system, and (2) an on-board processing component positioned on the controllable device, the on-board processing component to receive the one or more motion characteristics from the at least one communication network and to compute the command signal.

21. The system of claim 20, wherein the processing component includes:
at least one communication network operatively coupled to the motion capture system;
an application computer operatively coupled to the at least one communication network to compute the command signal; and
one or more control modules operatively coupled to the at least one communication network to receive the command signal, and to transmit the command signal to the controllable device.

22. The system of claim 20, wherein the motion capture system includes a plurality of detection devices operatively positioned with respect to the control volume, the plurality of detection devices to determine six-degree-of-freedom information for the controllable device.

23. The system of claim 20, wherein the motion capture system includes a plurality of motion detection cameras to detect at least some of the retro-reflective markers.

24. The system of claim 23, wherein the plurality of motion detection cameras track the retro-reflective markers using at least one of a visible wavelength portion of the spectrum and an infrared wavelength portion of the spectrum.

25. The system of claim 20, wherein the controllable device comprises at least one of a vehicle, and a robot.

26. A method of operating a controllable device, comprising:
measuring one or more motion characteristics of the controllable device using a motion capture system operatively disposed with respect to a control volume as the controllable device operates within the control volume, the one or more motion characteristics measured using a plurality of retro-reflective markers positioned on the controllable device in a pattern unique to the type of controllable device;
receiving the one or more motion characteristics from the motion capture system using at least one communication network;
comparing the received motion characteristics with desired motion characteristics;
determining a command signal based on the compared motion characteristics, wherein the determining the command signal includes: (1) receiving the one or more measured motion characteristics from the at least one communication network into an on-board processing component positioned on the controllable device, and (2) computing the command signal using the on-board processing component; and
transmitting the command signal to the controllable device to control at least one motion characteristic of the controllable device in a closed-loop feedback manner.

27. The method of claim 26, wherein:
receiving the one or more measured motion characteristics includes receiving the one or more measured motion characteristics using at least one communication network;
determining a command signal includes determining a command signal using an application computer operatively coupled to the at least one communication network; and
transmitting the command signal to the controllable device includes transmitting the command signal from the application computer to the controllable device.

28. The method of claim 27, further comprising reconditioning the command signal from application computer into a reconditioned signal suitably formatted for the controllable device.

29. The method of claim 26, wherein measuring the one or more motion characteristics includes measuring the one or more motion characteristics using a plurality of motion detection devices operatively distributed about at least a portion of the control volume, the motion detection devices to determine six-degree-of-freedom information for the controllable device operating within the control volume.

30. The method of claim 26, wherein measuring the one or more motion characteristics using a plurality of camera devices to track the retro-reflective markers using at least one of a visible wavelength portion of the spectrum and an infrared wavelength portion of the spectrum.

31. The method of claim 26, wherein measuring the one or more motion characteristics of the controllable device includes measuring the one or more motion characteristics of at least one of a vehicle, and a robot.

32. A method of viewing an activity, comprising:
positioning a moveable device within a control volume, the moveable device being equipped with a viewing device to view the activity;
measuring one or more motion characteristics of the moveable device using a motion capture system operatively disposed with respect to the control volume as the moveable device operates within the control volume, the motion capture system to measure an orientation of the moveable device by detecting a plurality of retro-reflective markers positioned on the moveable device;
receiving the one or more measured motion characteristics from the motion capture system using at least one communication network;
determining a command signal based on the one or more motion characteristics, wherein the determining the command signal includes: (1) receiving the one or more measured motion characteristics from the at least one communication network into an on-board processing component positioned on the moveable device, and (2) computing the command signal using the on-board processing component; and
transmitting the command signal to the moveable device to control at least one motion characteristic of the moveable device in a closed-loop feedback manner.

33. The method of claim 32, wherein:
receiving the one or more measured motion characteristics includes receiving the one or more measured motion characteristics using at least one communication network;
determining the command signal includes determining a command signal using an application computer operatively coupled to the at least one communication network; and
transmitting the command signal to the moveable device includes transmitting the command signal from the application computer to the moveable device.

34. The method of claim 32, wherein measuring the one or more motion characteristics includes measuring the one or more motion characteristics using a plurality of motion detection devices operatively distributed about at least a portion of the control volume, the motion detection devices to determine six-degree-of-freedom information for the moveable device operating within the control volume.

35. The method of claim 32, wherein measuring the one or more motion characteristics includes measuring the one or more motion characteristics using a plurality of camera devices to track the retro-reflective markers using at least one of a visible wavelength portion of the spectrum and an infrared wavelength portion of the spectrum.

\* \* \* \* \*

UNITED STATES PATENT AND TRADEMARK OFFICE
CERTIFICATE OF CORRECTION

PATENT NO.      : 7,643,893 B2  Page 1 of 1
APPLICATION NO. : 11/459631
DATED           : January 5, 2010
INVENTOR(S)     : Troy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 482 days.

Signed and Sealed this

Sixteenth Day of November, 2010

David J. Kappos
*Director of the United States Patent and Trademark Office*